3,088,845
METHOD OF IMPREGNATING THE WOODEN STRUCTURE OF COOLING TOWERS TO PRESERVE THE SAME
Donald R. Baker, Blue Springs, Mo., and Charles E. Loetel, Overland Park, Kans., assignors to The Marley Company, Kansas City, Mo., a corporation of Delaware
No Drawing. Filed June 16, 1959, Ser. No. 820,609
3 Claims. (Cl. 117—57)

This invention relates to cooling towers and more particularly, to a method of preserving the water saturated wooden structure therein.

The section of heat exchanging equipment referred to as the cooling tower generally has a water distribution system, a splash deck, louvers, structural members and an outer casing made of wood. In towers of this type, water is permitted to gravitate from the distribution trays through the louvered or ventilated splash deck and consequently, the wood soon becomes saturated with water and is thereby subject to rapid deterioration. The saturated condition of the wood, as well as the inaccessible position of certain of the components of the tower, has thwarted attempts to preserve the wood therein after the cooling tower has been placed in use, short of complete dismantling and treatment of the components thereafter. It is highly desirable, however, to impregnate this wood with relatively insoluble materials that are toxic to insects and wood destroying organisms in order to preserve the wood. Many materials are known and have been used to treat the wood in that they are toxic to these organisms and insects, but they have been applied to the dry wood before fabrication.

In order to preserve wood that is used in cooling towers it is necessary to first obtain a complete impregnation of the wood with the toxic materials and also to use a material that will not be easily leached out. Past methods of impregnating wood have included (1) application of a solution under pressure, possibly preceded or followed by a vacuum; (2) diffusion in green wood using natural sap as the carrier; (3) soaking in a solution of the preservative; (4) a hot dip followed by a cold dip to draw the solution into the cell cavities of the wood; and (5) by the application of a paste to dry wood and allowing it to penetrate with time. None of these methods, however, lend themselves to the treating of water saturated wood in a cooling tower which has been in use for some time. Another important consideration is the necessity of providing a treatment process which can be carried out in a short period of time, or does not involve closing down of the tower for an extended period in order to effect preservation of the wood therein.

Having regard to these problems, the primary object of this invention is to provide a method of treating the wooden structure of a cooling tower after the tower has been placed in use and the wood has become saturated with water, and further, to provide a method of treating the wood in cooling towers with a wood preservative that is permanent and will not leach out.

The basic steps of the present invention can be generally illustrated by the following flow sheet:

Saturating structure to be treated, with water
Applying moist impregnating composition including a metallic sulfate, metallic dichromate, an arsenic compound and a fluoride, to saturated structure. pH of the composition below 3.5
Maintaining pH of composition on structure below 3.5
Applying water to composition on structure to cause components thereof to diffuse into wood
Converting the constituents of the impregnating composition to insoluble salts within the wood One of the important aims of the instant invention is the provision of a method of impregnating the water saturated wood of cooling towers by causing a wood preservative to diffuse into the wood, the diffusion taking place by virtue of a difference in the solution pressure of the preservative and the water within the wood. A still further aim is the method of preserving the wooden structure of cooling towers by impregnating the wood with a composition including ingredients capable of reacting within the wood after diffusion of the composition into the interstices and cell walls of such wooden components, to form a water insoluble preservative therein which is resistant to leaching.

This invention has for a yet further aim the method of treating the wooden structure of a cooling tower by applying to the moist surface of the wood a water soluble preservative gel for a time sufficient to cause impregnation of the wood with the preservative and, further, to a method of maintaining the gel sufficiently moist for an extended period to cause the preservative to diffuse into the wood because of the difference in solution pressure between the preservative composition and the water in the wood. An additional important object is to provide a method of treating the wooden structure of a cooling tower as defined above wherein a gel is employed and including the novel step of directing a fine spray of water onto the surface of the wood having the gel thereon until all of the preservative has substantially diffused into the wood.

Another important object of the invention is to provide a preservation method as outlined above wherein the preservative composition includes ingredients capable of reacting to form a water insoluble toxic preservative when the composition is above a predetermined pH and wherein the present method includes the step of maintaining the pH of the composition below the pH at which the ingredients react, to thereby effect reaction and thus precipitation of the water insoluble toxic material within the interstices and cell walls of the wood and thereby assuring complete impregnation of the saturated wooden components of the tower.

Also an object of the present invention is the provision of an economically feasible method of treating water saturated wood in a cooling tower after the tower has been fabricated and assembled in place by the method set forth above.

More specific objects of the invention will appear during the course of the following specification.

The wooden components of a cooling tower may be treated in accordance with the present invention by using any one of a number of equally advantageous treatment procedures. During normal use of a tower, certain parts thereof, including the distribution trays, the fill assemblies, the eliminators and louvers, and portions of the structural members as well as the outer casing are continuously subjected to flowing streams of water, while other wooden components are disposed in the vapor zone of the water. As a result, the wooden components become substantially saturated with water over a period of time. One method of treating the water saturated components involves preparing a substantially liquid composition including water soluble wood preservatives and emulsified water insoluble material present in predetermined proportions and with the ingredients diffusing into the wood because of the difference in solution pressure between the preservative composition and the water initially present in the wooden components of the tower. The preservative ingredients should be chosen so that at least certain of the same are capable of reacting to form a water insoluble toxic material within the interstices and cell walls of the wood when the pH of the composition is above a predetermined level. Furthermore, the proportion of the ingredients in the preservative composition preferably should constitute at least 25% by weight of the total weight of the entire preservative solution and thereby including the water. The maximum quantity of each ingredient is normally that which is in excess of the solubility product of the particular material and thus resulting in a slurry with respect to that particular ingredient, but which is commercially feasible from a cost standpoint. The materials which interact to produce insoluble preservation agents should always be present in at least stoichiometric proportions, however, in order to assure thorough treatment of the tower.

In order to determine the amount of preservative solution which is required for a particular treatment operation as well as the quantity of each of the ingredients which should be incorporated into the treatment solution, it is usually desirable to first calculate the board feet of wood in the tower to be treated and in terms of volume. Next, it is determined what amount of toxic materials are desirable or needed per unit volume in the wood in order to preserve the wood for an extended period. With these factors known, the quantities of active materials in terms of weight can readily be calculated, assuming that all of the preservatives actually diffuse into the wood. In most instances, it is preferred to use an average of materials in order to assure disposition of the defined predetermined quantities thereof in the wood. Next, the weighted quantities of preservatives are placed in sufficient water only to cover all of the surfaces to be treated.

The basic methods of application of the preservative composition as contemplated by the present invention include the process of preparing a solution or slurry as described above, and then spraying the solution onto the water saturated structure. For purposes of explanation only, the treatment of a conventional double flow tower is preferably carried out as follows. A portion of the solution described above is directed onto the distribution basin of the tower by utilization of a hose without a nozzle whereby the basin is subjected to the preservative material and then the latter gravitates therefrom and falls onto the fill assemblies. Only sufficient solution is used to cover the fill assemblies and the distribution base. At the base of the fill assemblies, where some channeling normally occurs, additional quantities of the solution are sprayed onto the wood which has not been subjected to the preservative composition, with a nozzle to be placed on the hose to produce the desired spraying operation. Solution is also sprayed, as set forth immediately above, onto surfaces such as the casing walls, louvers, the fan deck and cylinder, structural members, eliminators, and other non-flooded sections of the tower. Another advantageous method of treating the non-flooded sections will be described in greater detail hereinafter and utilizing a thixotropic gel.

In the treatment of a counterflow tower, the solution is sprayed directly onto the eliminators which overlie the fill assemblies, since towers of this type do not have distribution trays of the type found in crossflow towers. In this instance the gel, briefly referred to above, may also be applied to the eliminators. The remaining part of the treatment process is the same as previously described.

It is to be understood that certain of the constituents of the solution are capable of reacting with each other above a predetermined pH to produce a toxic, water insoluble preservative within the wood but in order to prevent such precipitation until after the ingredients of the solution have diffused into the wood, such solution is maintained at a pH below that at which the active ingredients react. After application of the solution to all of the water saturated components of the tower, additional water may be sprayed onto the treated structure in sufficient quantities only to maintain the preservative composition on the outer surfaces of the wood in a moist condition. Any runoff or drippings from the spraying operations are collected in the basin of the cooling tower and preferably reapplied to the tower as outlined above.

As an alternative process according to the procedure set forth above, the solution may be continuously flooded over the surfaces of the wood, collected and reflooded over the tower until the required diffusion of the preservative constituents into the wooden components is obtained. An additional process involves placement of powdered ingredients of the character described on the surfaces of the wood, followed by sprinkling of sufficient water thereonto to produce a solution whereby the ingredients then diffuse into the wooden components. Again, any runoff from this operation may be collected in the sump below the tower and reapplied in the manner indicated in detail above.

Utilizing similar techniques, a gel, preferably of thixotropic characteristics, may be formed of the preservative constituents followed by application of the gel to the outer surfaces of the wooden components and then maintenance of the pasted surfaces in a moist condition until sufficient diffusion of the preservative constituents into the wood has occurred.

The impregnation of the water saturated wood, when a solution, gel or slurry of the wood preservatives are applied thereto, is accomplished by virtue of the variation in solution pressure between the preservative ingredients and the water within the wood. The dissolving of a solid in a liquid involves several factors. In ideal solutions the molecules break away from the crystal and fill the volume of the solvent until the solution is saturated. The factors that affect the solubility of a solid in a liquid are concentration, temperature and pressure. The method of this invention takes advantage of the concentration factor, as it would be completely impractical to vary the temperature or pressure of a solution to be used to impregnate a cooling tower subsequent to use. In a homogeneous solution the system is in equilibrium and a sample from any portion will be identical with any other portion but, when a heterogeneous solution is present, a sample from one portion will not be identical with the other. However, if the portions of the heterogeneous solution are miscible with each other, then diffusion of one portion into the other takes place due to the solution pressure of the portions having the higher concentration, eventually an equilibrium being established in which the solution will become substantially homogeneous throughout. The rate at which this diffusion takes place will vary with the concentration increment between the various portions. Therefore, in the present invention, when a solution of preservative ingredients having a higher solution pressure than the water within the wood is applied to the surface of that wood, diffusion takes place as the equilibrium is established and the wood becomes impregnated with the preservative. It can therefore be seen that the advantage of using a slurry, solution or gel of the preservative composition lies in the fact that the solution pressure of the impregnating material remains high throughout the period that diffusion is taking place.

The impregnation can be carried out by the use of various suitable materials, including soluble ingredients such as dichromates and metallic sulfates which react to form a water insoluble toxic compound when the pH of the composition rises above a predetermined value, as well as an emulsion of water insoluble materials.

Specific examples of suitable impregnating compositions are the following:

Example 1

| | Parts by weight |
|---|---|
| Copper sulfate ($CuSO_4 \cdot 5H_2O$) | 30 |
| Zinc sulfate ($ZnSO_4 \cdot 2H_2O$) | 30 |
| Sodium dichromate ($Na_2Cr_2O_7 \cdot 2H_2O$) (or potassium dichromate) | 18 |
| Arsenic acid ($H_3AsO_4 \cdot \frac{1}{2}H_2O$) | 20 |
| Sodium fluoride | 2 |

Example 2

Same as in Example 1 with the exception of the substitution of an equivalent proportion of chromic acid for the sodium dichromate.

Example 3

Same as in Example 1 with the addition of approximately 2 parts by weight of the total admixture of boric acid.

Example 4

Same as in Examples 1 or 3 with the addition of approximately 0.5 part by weight of the total admixture of a detergent such as "Tergitol 08," a proprietary product of Union Carbide Chemicals Co. and constituting a sodium sulfate derivative of 2-ethyl hexanol-1.

Example 5

Same as in Examples 1, 3 or 4 with the addition of approximately 7 parts by weight of the total admixture of calcium silicate. The quantity of gelling agent generally may vary within the range of from 5 to 9 parts by weight.

Example 6

| | Parts by weight |
|---|---|
| Copper sulfate ($CuSO_4 \cdot 5H_2O$) | 60 |
| Sodium dichromate ($Na_2Cr_2O_7 \cdot 2H_2O$) (or potassium dichromate) | 18 |
| Arsenic acid ($H_3AsO_4 \cdot \frac{1}{2}H_2O$) | 20 |
| Sodium fluoride | 2 |

Example 7

| | |
|---|---|
| Zinc sulfate ($ZnSO_4 \cdot 2H_2O$) | 60 |
| Sodium dichromate ($Na_2Cr_2O_7 \cdot 2H_2O$) (or potassium dichromate) | 18 |
| Arsenic acid ($H_3AsO_4 \cdot \frac{1}{2}H_2O$) | 20 |
| Sodium fluoride | 2 |

Example 8

| | |
|---|---|
| Copper sulfate ($CuSO_4 \cdot 5H_2O$) | 34.20 |
| Zinc sulfate ($ZnSO_4 \cdot H_2O$) | 23.00 |
| Chromic acid ($CrO_3$) | 21.40 |
| Arsenic acid ($H_3AsO_4 \cdot 75\%$) | 12.80 |
| Boric acid ($H_3BO_3$) | 4.30 |
| Tergitol 08 | .01 |
| Sodium fluoride (NaF) | 4.29 |

Example 9

| | |
|---|---|
| Copper sulfate ($CuSO_4 \cdot 5H_2O$) | 54.00 |
| Arsenic acid ($H_3AsO_4 \cdot 75\%$) | 9.50 |
| Boric acid ($H_3BO_3$) | 4.60 |
| Sodium dichromate ($Na_2Cr_2O_7 \cdot 2H_2O$) | 16.50 |
| Zinc undecylenate ($Zn(C_{11}H_{22}O)_2$) | 5.40 |
| Sulfonated castor oil (emulsifier) | 5.00 |
| Sodium fluoride (NaF) | 5.00 |

The zinc undecylenate is emulsified in water and added to the regular solution.

The preservative constituents of the compositions set forth in the examples above form insoluble chromates, arsenates, borates and fluorides where applicable in the wood into which the materials are diffused.

In all cases, soluble or emulsified materials are used which may react when coming into contact with one another at a predetermined pH, or materials within the wood to produce relatively insoluble precipitates that are toxic to the wood destroying organisms. The various chemicals are proportioned to produce the desired end product and therefore, stoichiometric proportions are preferably used although it is sometimes desirable to utilize an excess of some material to assure complete reaction of the others. Generally, the excess material should be one of the chromates so that chromate ions remain on the tower after completion of the treatment process rather than highly toxic substances such as sodium arsenates. Furthermore, the chromates serve to maintain the solution at the most favorable pH.

It has been determined that the compositions of the examples above should be applied to the water saturated wooden components of the tower for a period of approximately 72 hours, although adequate penetration and thereby preservation of the wood has been obtained in certain instances in shorter periods of time. Longer periods of subjection of the water saturated wood to the treating composition enhance the degree of impregnation to a certain extent, but these longer methods are commercially impractical in most instances because of the necessity of shutting down the tower during the treating process.

The surface active agent set forth in Example 4, or equivalents thereof, serves the important function of lowering the surface tension of the water on the outer surfaces of the saturated structure and therefore, the preservative composition covers such outer surfaces to a greater degree than would otherwise be the case and produces better impregnation. This is especially true with respect to joints and bolt holes, since the impregnating composition readily passes into the crevices and cracks presented at these areas.

The gel produced in Example 5 is thixotropic in character and therefore may be applied as a liquid from suitable spray means with the composition forming a gel on the outer moist surfaces of the structural components of the tower. This gel is especially valuable for utilization on structural members of the tower because of the thickness of such components and the necessity of maintaining the preservative solution in contact with the members for a maximum period of time to cause the toxic substance to penetrate to the innermost area thereof. The gel may be left on the structural members even though the same has again been placed in operation and diffusion of the impregnating substances permitted to take place over an extended time period. Since the structural members or other components to which the gel is applied are in the vapor zone of the tower rather than in the path of direct flow water, the gel is maintained in a moist condition until all of the active ingredients have diffused into the wood. It is to be understood that the non-flooded sections of the tower having the gel thereon are not neutralized with sodium carbonate to prevent premature precipitation of the toxic agents.

Because of the fact that the wood tends to reduce the chromates at too rapid a rate, it is desirable that the impregnating compositions be maintained at a pH sufficiently acid to prevent precipitation of the insoluble arsenates, borates, fluorides or other reactants. In most instances, it is preferred that the solution be maintained at a pH of approximately 1.0, Example 8 above being a typical solution having a pH of the preferred value. The pH of the solutions of Examples 1 to 6, 8 and 9 should not in most instances be permitted to rise above approximately 3.5, while the solution of Example 7 should not be permitted to go above about 2.5.

After the saturated structure of the cooling tower has been subjected to the impregnating composition for the stipulated period, it is necessary with respect to the flooded portion of the tower, to carry out a neutralization process in order to raise the pH of the solution on and within the wood and thereby effect rapid interaction of the active ingredients to produce water insoluble toxic materials of the character referred to above. This neutralization can most effectively be practiced by passing a substantially saturated solution of sodium carbonate over the flooded areas of the tower until the liquid collected in the sump has a pH of approximately 7.0 or above.

Neutralization of the impregnating composition with sodium carbonate or the like, in and on the non-flooded sections, may not be required inasmuch as carbohydrates and other substances present in the wood serve to cause the active ingredients to react within the wood and thus produce the desired toxic, water insoluble precipitate.

An additional change which may be made in the treatment process which produces somewhat better results in certain instances, involves direction of a solution of boric acid over the tower to substantially acidify the outer moist surfaces thereof and which tends to maintain the preservative composition in an acid condition throughout the preservation process. The boric acid subsequently reacts with constituents of the impregnating composition to form water insoluble borates within the wood. Other acids, for example sodium bisulfite or acetic acid, phosphoric acid and equivalent acids could be used. Boric acid has the advantage of forming an insoluble material within the wood.

A somewhat more expensive, although satisfactory method of application of the present compositions comprises making up a slurry or solution of the active ingredients in the sump of the tower and then continuously pumping such solution over the top of the tower for the required time. The principal disadvantage of this procedure is the amount of unused solution which remains in the sump upon completion of the preservation treatment and which normally must be neutralized with sodium carbonate or equivalent chemicals. It is to be noted, however, that neutralization of any solution remaining in the bottom of the tower and on the wooden components thereof is preferably carried out by applying a solution of sodium carbonate to the tower, regardless of the type of treatment utilized.

As also set forth above, the dry material may be applied to the moist surface of the wood and a fine spray of water maintained on the surface of the wood to keep the material damp. The preservatives dissolve in the water to the extent of their solubility in the small amount of water present on the surface of the wood, and the resulting concentrated preservative solution causes rapid diffusion of the preservative into the wood.

A principal feature of the process is the fact that inexpensive, readily obtainable products on the open market may be employed to treat the wood, a method now being presented in which any material soluble in water or in any other suitable solvent or an emulsified material may be used to impregnate the water saturated wood without the necessity of tearing down and dismantling the cooling tower in order to treat the wood therein. Although the method of the present invention is directed toward treatment of water saturated structure in a cooling tower, it could also be applied to any wood which has become completely saturated with water. If feasible, the wood, if not already saturated with water, may be saturated and the present process carried out. In this respect, it has been determined that the cooling tower or other wood should be subjected to water for a period of approximately six months in order to assure complete saturation of the wooden structure.

Having thus described the invention what is claimed as new and desired to be secured by Letters Patent is:

1. In a method of treating the wooden structure of cooling towers by impregnation with a wood preservative subsequent to fabrication thereof, the improved steps of:
   completely saturating the wooden structure of the cooling tower to be treated with wood preservative, with water and while the tower is in a fabricated condition;
   confining a quantity of water sufficient only to substantially cover and provide a layer of water over the entire outer surface of the wooden structure of the cooling tower to be treated with said wood preservative;
   adding predetermined amounts of normally substantially water soluble preservative ingredients to said quantity of water to produce a treating composition and including a metallic sulfate, a metallic dichromate, an arsenic compound and a component having a fluoride radical, all of said ingredients being at least partially dissolved in said quantity of water and present in amounts to effect impregnation of said wooden structure to be treated, with sufficient active ingredients to preserve the wood for an extended period of time, said ingredients being capable of reacting above a pH of approximately 3.5 to form a water insoluble wood preservative;
   applying the treating composition to all of the outer surfaces of said wooden structure to be treated with the wood preservative;
   applying water to said outer surfaces of the wooden structure undergoing treatment and while the treating composition is thereon, only sufficient water being applied to maintain the surfaces of the wooden structure in a moist condition with minimum runoff, and until the ingredients have diffused into the water saturated wooden structure;
   maintaining the proportion of the treating solution on the outer surface of said water saturated wooden structure at a pH below 3.5 until substantially said amounts of the ingredients have penetrated into the wooden structure; and
   then raising the pH of the composition in said water saturated wooden structure to a level above 3.5 by passing an alkali neutralizing agent over said wooden structure to thereby cause the ingredients to react and form insoluble precipitates within the wooden structure.

2. A method as set forth in claim 1 wherein said alkali neutralizing agent is sodium carbonate.

3. In a method of treating the wooden structure of cooling towers by impregnation with a wood preservative subsequent to fabrication thereof, the improved steps of:
   completely saturating the wooden structure of the cooling tower to be treated with wood preservative, with water and while the tower is in a fabricated condition;
   confining a quantity of water sufficient only to substantially cover and provide a layer of water over the entire outer surface of the wooden structure of the cooling tower to be treated with said wood preservative;
   adding predetermined amounts of normally substantially water soluble preservative ingredients to said quantity of water to produce a treating composition and including a metallic sulfate, a metallic dichromate, an arsenic compound and a component having a fluoride radical, all of said ingredients being at least partially dissolved in said quantity of water and present in amounts to effect impregnation of said wooden structure to be treated, with sufficient active ingredients to preserve the wood for an extended period of time, said ingredients being capable of reacting above a pH of approximately 3.5 to form a water insoluble wood preservative;
   applying the treating composition to all of the outer surfaces of said wooden structure to be treated with the wood preservative;

applying water to said outer surfaces of the wooden structure undergoing treatment and while the treating composition is thereon, only sufficient water being applied to maintain the surfaces of the wooden structure in a moist condition with minimum runoff, and until the ingredients have diffused into the water saturated wooden structure;

collecting any liquid runoff containing said ingredients and reapplying the same to said wooden structure during the period the composition is maintained in contacting relationship with the wooden structure;

maintaining the proportion of the treating solution on the outer surface of said water saturated wooden structure at a pH below 3.5 until substantially said amounts of the ingredients have penetrated into the wooden structure; and then raising the pH of the composition in said water saturated wooden structure to a level above 3.5 by passing an alkali neutralizing agent over said wooden structure to thereby cause the ingredients to react and form water insoluble precipitates within the wooden structure.

References Cited in the file of this patent

UNITED STATES PATENTS

| | | |
|---|---|---|
| 1,082,658 | Somermeier | Dec. 30, 1913 |
| 1,905,327 | Zumwalt | Apr. 25, 1933 |
| 2,012,975 | Schmittutz | Sept. 3, 1935 |
| 2,041,655 | Gunn | May 19, 1936 |
| 2,895,848 | Baker | July 21, 1959 |
| 2,919,971 | Loetel | Jan. 5, 1960 |
| 2,964,426 | Holtschmidt | Dec. 13, 1960 |
| 2,967,787 | Murphy | Jan. 10, 1961 |

OTHER REFERENCES

"Wood Preservation," Van Groenou, Holland, 1951, pp. 117–130.